United States Patent Office 3,264,086
Patented August 2, 1966

3,264,086
SILICOPHOSPHATIC PRODUCT AND METHOD OF MAKING SAME
Clinton A. Hollingsworth, Lakeland, Fla., and Billy J. Phillips, Virginia Beach, Va., assignors, by mesne assignments, to The Borden Company, a corporation of New Jersey
No Drawing. Filed Aug. 9, 1963, Ser. No. 301,172
13 Claims. (Cl. 71—41)

This invention relates to a stable, free-flowing phosphatic product having a high phosphorus content and a high phosphorus to alkaline earth metal weight ratio, the phosphorus content of the product being in a form which is readily available to plants and animals.

Phosphorus is an essential element in the growth processes of plants and animals, and millions of tons of phosphate fertilizers and animal feed supplements are produced annually in the United States. The phosphatic constituents of fertilizers and animal feed supplements must be in a form that is available to plants and animals, and in the case of animal feed supplements the fluorine content of the material must be well below the amount that can be tolerated by animal life. Moreover, for obvious economic and nutrient reasons it is desirable that the phosphorus content of fertilizers and animal feed supplements be as high as practical considerations permit. Phosphate rock, the principal source of phoshatic chemicals, ordinarily consists predominantly of phosphatic complexes termed apatites and fluorapatites, and these relatively unavailable apatites must be converted to forms of phosphate that are available biologically and, in the case of animal feed supplements, that contain less than one part of fluorine per 100 parts of phosphorus by weight.

Acidulation of phosphate rock with sulfuric acid or phosphoric acid by known procedures will produce "superphosphates" the phosphatic component of which is theoretically hydrated monobasic calcium (ortho) phosphate, an available form of phosphorus. However, the maximum phosphorus content of superphosphates (i.e. between about 7 to 9% P in the case of ordinary superphosphate and about 20 to 22% P in the case of triple superphosphate) and the maximum phosphorus to calcium weight ratio of these materials (i.e. about 0.52 in the case of ordinary superphosphate and about 1.55 in the case of triple superphosphate) is limited by the chemical composition of superphosphates, and the presence of even as little as 1 or 2% of excess phosphorus in the form of free phosphoric acid makes these materials excessively hygroscopic and difficult to handle. Moreover, superphosphates prepared from fluorapatite phosphate rock ordinarily contain too much fluorine to be used as animal feed supplements without further treatment to reduce the fluorine content thereof.

Animal feed supplements having an acceptably low fluorine content can be produced by reacting fine limestone with sufficient low-fluorine phosphoric acid to form dibasic and monobasic calcium (ortho) phosphates containing from about 21 to 26% by weight of phosphorus and having a phosphorus to calcium ratio of between about 0.77 and 1.55. However, the phosphorus content of these calcium phosphate products is again limited by their chemical composition and the presence of even a small amount of excess phosphorus in the form of free phosphoric acid renders them unacceptably hygroscopic. In addition, defluorinated phosphate products can be produced by high temperature calcination of phosphate rock pursuant to various known procedures. However, thermally defluorinated rock rarely contains over 18% by weight of phosphorus, and frequently contains less than 16% P, and the phosphorus to calcium weight ratio of the calcined product seldom exceeds about 0.55. Attempts heretofore to increase the phosphorus content and P/Ca ratio of thermally defluorinated rock have not met with success or have resulted in a product that has unacceptably low availability or that has excessive hygroscopicity.

We have now discovered that, contrary to the previous experience of workers in this field, a granular free-flowing, relatively non-hygroscopic phosphate product containing up to 27% phosphorus and up to 9% free (acetone soluble) phosphoric acid and having a phosphorus to calcium (or equivalent) weight ratio of up to about 2.5 can be produced by treating certain phosphatic compounds and compositions of matter with phosphoric acid advantageously in an amount in excess of that required theoretically to convert the phosphatic values therein to their monobasic (ortho) phosphate form. Specifically, we have found that phosphatic compositions of matter comprising predominantly at least one alkaline earth metal silicophosphate or complex alkaline earth metal-alkali metal silicophosphate can be treated with phosphoric acid as described herein to produce a new and stable stable composition of matter having the aforementioned unique characteristics, and in particular we have found that a thermally defluorinated phosphate rock product comprising predominantly a solid solution of calcium silicophosphates and calcium sodium silicophosphates containing about 18% by weight of phosphorus can be converted to a stable, free-flowing, relatively non-hygroscopic, and biologically available phosphate product containing up to about 27% by weight of phosphorus and up to about 9% by weight of free (acetone soluble) phosphoric acid and having a phosphorus to alkaline earth metal (calculated as equivalent Ca) weight ratio of up to about 2.5 by reaction of the silicophosphatic material with phosphoric acid of low fluorine content under the conditions hereinafter described.

As noted, the essential constituent of the phosphatic raw material employed in the manufacture of our new product comprises one or more alkaline earth metal silicophosphates or complex alkaline earth metal-alkali metal silicophosphates. Our invention is predicated on our discovery that these silicophosphatic compositions of matter have the ability to react with phosphoric acid to form a new, stable and free-flowing phosphatic product or composition of matter that quite unexpectedly has the unusual property of being able to hold or retain up to about 9% by weight of free (or acetone soluble) phosphoric acid in such a way that the free acid-containing product is relatively non-hygroscopic. That is to say, conventional phosphate products (for example, superphosphates) containing more than one or two percent free phosphoric acid are excessively hygroscopic and, as the product absorbs water due to its hygroscopicity, become sticky or otherwise difficult to handle. The new phosphate product of our invention is relatively non-hygroscopic in comparison with ordinary phosphate products of comparable free acid content, our new product retaining its relatively non-hygroscopic and free-flowing character with free acid contents up to about 9%. The manner in which the so-called free acid is retained by our new product is not clearly understood. However, the term "free acid" as employed herein refers to the amount of phosphoric acid, expressed in percent by weight of the total amount of the phosphate product, that can be recovered or separated from a well cured sample of the product by extraction with acetone in accordance with conventional acetone solubility test techniques.

We have found that a thermally defluorinated phosphate rock product containing about 16 to 18½% by weight of phosphorus and comprising predominantly a solid solution of calcium silicophosphate and calcium sodium silicophosphate is a particularly advantageous source of the silicophosphatic raw material useful in the practice of our invention, one such thermally defluorinated phosphatic product being described in U.S. Patent 2,995,437, issued August 8, 1961, although our invention is not limited to the use of the specific composition of matter described in this patent. Moreover, we have found that for best results the silicophosphatic raw material should have a relatively small particle size in order to promote completion of the reaction with phosphoric acid. Specifically, we have found that substantially all of the phosphatic material should be less than about 10 mesh (Tyler Standard) and preferably should be less than about 35 mesh (Tyler Standard).

The silicophosphate-containing phosphatic raw material ordinarily contains between about 15 to 18 or 18½% by weight of phosphorus, and this phosphatic material is mixed and reacted with an aqueous solution of phosphoric acid in an amount sufficient to obtain a final product containing up to about 27% by weight of phosphorus on a dry basis. To produce a final product of acceptably low fluorine content, both the silicophosphatic and the phosphoric acid raw materials should have a relatively low fluorine content. The reaction between the silicophosphatic composition of matter and phosphoric acid may be carried out by mixing the two reactants together in such apparatus as a pug mill or the like, or, advantageously, in a fluid bed reactor. The phosphoric acid is preferably added to the phosphatic raw material continuously, for example, by spraying the acid onto the phosphatic material in a continuous flow reaction apparatus. The reaction product is dried and, if necessary, crushed to obtain a granular free-flowing product containing not more than about 5%, and preferably less than about 3%, free moisture. When the reaction is carried out in a fluid bed reactor a dry granular product is ordinarily obtained without the necessity for separate drying and crushing operations. The temperature of the reaction product during the drying operation should be kept below about 260° F., to avoid conversion of any appreciable portion of the reaction product to a form having relatively poor biological availability. The resulting dry granular product is a stable, biologically available phosphatic material that has a phosphorus to calcium weight ratio of up to 2.5 and that contains up to 27% phosphorus and up to 9% free (acetone soluble) phosphoric acid but that is nonetheless relatively non-hygroscopic and that can be bagged and stored indefinitely without appreciable deterioration or reversion to a biologically unavailable form of phosphate material.

The following examples are illustrative but not limitative of the practice of our invention:

EXAMPLE I

A number of samples of our new product were prepared by reacting various specific amounts of low fluorine wet process phosphoric acid with a silicophosphatic raw material. The silicophosphatic raw material was a thermally defluorinated phosphate product produced in accordance with the process of U.S. Patent 2,995,437. The defluorinated phosphatic raw material contained an average of 45.5% CaO, 41.5% $P_2O_5$, 6.5% $Na_2O$, 3.4% $SiO_2$ and 0.10% F; it had an average phosphorus content of 18.1% P, an average phosphorus to calcium (P/Ca) weight ratio of 0.55, and an average phosphorus to fluorine (P/F) weight ratio of 183; and the average solubility of the phosphate content of the material was 99.0% in 0.4% HCl, 95.2% in 2% citric acid, 95.8% in neutral ammonium citrate (NAC), and 39% in ammoniacal ammonium citrate (Peterman's solution). The phosphatic raw material was in the form of a dry, free-flowing clinker that contained no free phosphoric acid, and X-ray diffraction studies showed it to be comprised predominantly of a mutual solid solution of calcium silicophosphates and calcium sodium silicophosphates.

The silicophosphatic raw material having an average phosphorus content of 18.1% was reacted with sufficient wet process phosphoric acid to form five samples of my new product containing approximately 20%, 21%, 22.5%, 23.5% and 24.5% by weight of phosphorus, respectively. The first three samples were prepared by carrying out the reaction between the phosphoric raw material and phosphoric acid in a fluid bed reactor, and the last two samples were prepared by thoroughly mixing the reactants in a pug mill. The fluid bed reactor produced a dry granular product that required no further treatment, whereas the samples prepared in the pug mill were subjected to subsequent drying and crushing operations to obtain a product containing less than 1½% free moisture. The temperature of the fluid bed reactor and of the dryer was not allowed to exceed 250° F. in order to avoid conversion of any appreciable portion of the product to a non-available phosphate material.

The five sample products were analyzed to determine their calcium, phosphorus, sodium, silicon, fluorine and moisture content. The amount of free phosphoric acid in each sample was determined by conventional acetone solubility tests, and the phosphate availability of each sample was determined by conventional solubility tests in 0.4% HCl, 2.0% citric acid, neutral ammonium citrate, and ammoniacal ammonium citrate. The results of these analyses and tests are summarized in the following table:

*Table I*

| | Sample | | | | |
|---|---|---|---|---|---|
| | 1 | 2 | 3 | 4 | 5 |
| Weight percent: | | | | | |
| P | 19.87 | 21.06 | 22.45 | 23.57 | 24.63 |
| $P_2O_5$ | 45.6 | 48.2 | 51.5 | 54.0 | 56.3 |
| CaO | 36.62 | 29.14 | 27.68 | 17.43 | 16.24 |
| MgO | <0.1 | <0.1 | <0.1 | <0.1 | <0.1 |
| $Na_2O$ | 4.52 | 4.45 | 4.62 | 3.50 | 3.62 |
| $K_2O$ | 0.16 | 0.15 | 0.14 | 0.12 | 0.24 |
| $SiO_2$ | 1.69 | 1.45 | 1.60 | 1.18 | 1.27 |
| F | 0.12 | 0.14 | 0.20 | 0.17 | 0.10 |
| Moisture | 1.24 | 2.63 | 0.79 | 1.14 | 1.41 |
| Weight ratio: | | | | | |
| P/Ca | 0.77 | 1.00 | 1.12 | 1.88 | 2.08 |
| P/F | 165 | 150 | 112 | 139 | 246 |
| Free acid (acetone soluble— $H_3PO_4$ equivalent), wt. percent | 0.44 | 0.40 | 1.19 | 4.17 | 7.60 |
| Phosphate Solubility (Percent of Total P): | | | | | |
| 0.4% HCl | 100 | 99.2 | 98.8 | 94.7 | 99.8 |
| 2.0% citric acid | 94.7 | 96.0 | 95.8 | 93.4 | 98.0 |
| NAC | 93.9 | 95.9 | 96.5 | 99.0 | 97.2 |
| Peterman solution | 62 | 64 | 80 | 93 | 94 |

X-ray diffraction studies of all five samples show that our new product contains a substantial amount of calcium silicophosphate and calcium sodium silicophosphate admixed with varying amounts of calcium orthophosphates and other phosphatic substances. All five samples of our new product were dry, free-flowing, relatively non-hygroscopic materials that could be bagged and stored indefinitely without deterioration. Moreover, the low fluorine content, high phosphate availability, high phosphorus content and exceptionally high phosphorus to calcium weight ratio of our new product make it eminently suitable for use as a high grade fertilizer and animal feed supplement.

EXAMPLE II

Five samples of our new phosphatic composition of matter each containing somewhat different amounts of calcium, phosphorus, magnesium and potassium were prepared by reacting five different defluorinated silicophosphatic raw materials with phosphoric acid in accordance with our invention. The first of the five silicophosphatic starting or raw materials (prepared in this case by calcining a mixture of Florida phosphate rock, magnesium oxide and phosphoric acid to obtain a silicophosphatic product) contained about 2.5% by weight of silica, 18.47% by weight of phosphorus and 0.055% by weight of fluorine, the second phosphatic starting material or raw material (prepared by calcining a mixture of Florida phosphate rock, magnesium carbonate and phosphoric acid to obtain a silicophosphatic product) contained about 2.5% by weight of silica, 18.73% by weight of phosphorus and 0.017% by weight of fluorine, the third phosphatic starting material or raw material (prepared by calcining a mixture of Florida phosphate rock, potassium carbonate and phosphoric acid to obtain a silicophosphatic product) contained about 2.5% by weight of silica, 17.56% by weight of phosphorus and 0.025% by weight of fluorine, the fourth phosphatic starting material or raw material (prepared by calcining a mixture of Florida phosphate rock, magnesium oxide and phosphoric acid to obtain a silicophosphatic product) contained about 2.5% by weight of silica, 18.36% by weight of phosphorus and 0.1% by weight of fluorine, and the fifth phosphatic starting material or raw material (prepared by calcining a mixture of Florida phosphate rock, magnesium oxide and phosphoric acid to obtain a silicophosphatic product) contained about 2.5% by weight of silica, 18.03% by weight of phosphorus and 0.08% by weight of fluorine. Each of the five silicophosphatic raw materials was thoroughly mixed with sufficient defluorinated wet process phosphoric acid to obtain a final product containing about 21% phosphorus. The five reaction mixtures of silicophosphatic material and phosphoric acid were reacted in acordance with our invention and were dried at a temperature of about 220° F. to obtain five dry reaction products each containing about one-half of 1% moisture or less. Each reaction product was then analyzed to determine its phosphorus, calcium, magnesium, potassium, fluorine and approximate silica content, and the availability of the phosphorus content thereof was determined by conventional phosphate solubility tests. The results of the chemical analyses and phosphate solubility tests for each of these five products are presented in Table II.

*Table II*

| | Sample | | | | |
|---|---|---|---|---|---|
| | 1 | 2 | 3 | 4 | 5 |
| Weight Percent: | | | | | |
| P | 20.57 | 20.45 | 20.18 | 20.92 | 21.53 |
| $P_2O_5$ | 47.10 | 46.83 | 46.21 | 47.91 | 49.30 |
| CaO | 36.35 | 36.89 | 33.31 | 33.84 | 32.05 |
| MgO | 3.21 | 3.46 | | 3.43 | 3.81 |
| $K_2O$ | | | 7.91 | | |
| $SiO_2$ [1] | 2.0 | 2.0 | 2.0 | 2.0 | 2.0 |
| F | 0.051 | 0.035 | 0.044 | 0.14 | 0.07 |
| Moisture | 0.24 | 0.28 | 0.47 | | 0.67 |
| Weight Ratio: | | | | | |
| P/Ca | 0.80 | 0.78 | 0.85 | 0.87 | 0.91 |
| P/F | 403 | 584 | 455 | 149 | 308 |
| Phosphate Solubility (Percent of Total P): | | | | | |
| 0.4% HCl | 97.84 | 98.16 | 93.46 | 99.41 | 95.55 |
| 2.0% citric acid | 50.40 | 40.64 | 93.54 | 60.11 | 65.45 |
| NAC | 43.59 | 41.76 | 76.42 | 53.81 | 63.63 |

[1] Estimated.

The final product was in each case a stable, relatively non-hygroscopic composition of matter having a higher phosphate availability than commercially comparable phosphatic products.

It should be noted that the terms "alkali metal" and "alkaline earth metal" as employed herein are intended to apply specifically to those Group I and Group II metals which are beneficial to plant and animal life, and in particular to the alkali metals, sodium and potassium, and to the alkaline earth metals, calcium and magnesium. Moreover, the expression "phosphorus to alkaline earth metal (calculated as equivalent P/Ca) weight ratio" refers to the quotient obtained by dividing the weight of phosphorus present in the composition by the weight of the alkaline earth metals present therein, the weight of said alkaline earth metals being expressed as the weight of a molar equivalent quantity of calcium.

We claim:
1. Process for producing a stable, free flowing, relatively non-hygroscopic phosphatic composition of matter having high phosphate availability and a high phosphorus to alkaline earth metal weight ratio which comprises: reacting a phosphatic material composed predominantly of a solid solution of at least one silicophosphate selected from the group consisting of alkaline earth metal silicophosphates and alkaline earth metal-alkali metal silicophosphates with a quantity of phosphoric acid sufficient to form a reaction product having a phosphorus to alkaline earth metal (calculated as equivalent P/Ca) weight ratio of between about 0.7, 2.5 and containing up to 27% by weight phosphorus and capable of containing up to about 9% by weight free, acetone soluble) phosphoric acid, said phosphatic material having a phosphorus content of not more than about 18% P and being in the form of particles substantially all of which have a particle size of minus 10 mesh (Tyler Standard); drying the product of said reaction to obtain a phosphatic composition of matter containing not more than 5% by weight of moisture; and recovering said dry, free flowing, relatively non-hygroscopic composition of matter.

2. Process for producing a stable, free-flowing, relatively non-hygroscopic phosphatic composition of matter having high phosphate availability, a high phosphorus to calcium weight ratio and a phosphorus to fluorine weight ratio of at least 100 which comprises: reacting a thermally defluorinated phosphatic material comprising predominantly a solid solution of at least one silicophosphate selected from the group consisting of calcium silicophosphates and calcium sodium silicophosphates with an amount of phosphoric acid of low fluorine content sufficient to form a reaction product having a phosphorus to calcium weight ratio of between about 0.7 and 2.5, containing between about 18 and about 27% by weight of phosphorus and capable of containing up to about 9% by weight of free (acetone soluble) phosphoric acid, said thermally defluorinated phosphatic material having a phosphorus content of between about 15 to 18% P and a P/F weight ratio of at least 100 and being in the form of particles substantially all of which are less than about 10 mesh (Tyler Standard) in size; drying the product of said reaction to obtain a phosphatic composition of matter containing not more than about 5% by weight of moisture; and recovering the desired dry, free flowing, relatively non-hygroscopic phosphatic composition of matter.

3. The process according to claim 2 in which the temperature of the reaction mixture and reaction product is maintained below about 260° F. during the reaction and drying operations, respectively.

4. The process according to claim 2 in which the reaction and drying operations are carried out concurrently in a fluid bed reactor.

5. The process according to claim 2 in which substantially all of the phosphatic material is less than about 35 mesh (Tyler Standard) in size.

6. A stable, free-flowing, relatively non-hygroscopic silicophosphate-containing composition of matter having high phosphate availability, having a phosphorus to alkaline earth metal (calculated as equivalent P/Ca) weight ratio of between about 0.7 and 2.5, containing up to about 27% by weight of phosphorus and capable of containing up to about 9% by weight of free (acetone soluble) phosphoric acid, said composition of matter comprising the reaction product of phosphoric acid and a phosphatic raw material, said phosphatic raw material comprising predominantly at least one silicophosphate selected from the group consisting of alkaline earth metal silicophosphates and complex alkaline earth metal-alkali metal silicophosphates, the proportion of said phosphoric acid and phosphatic raw material being such that the reaction product thereof has the phosphorus to alkaline earth metal ratio and the phosphorus content herein set forth.

7. The composition of matter according to claim 6 in which the phosphorus content is between about 18 and about 27% by weight.

8. The composition of matter according to claim 6 in which the phosphatic raw material comprises predominantly at least one silicophosphate selected from the group consisting of calcium silicophosphates and complex calcium sodium silicophosphates.

9. The composition of matter according to claim 6 in which the phosphorus to fluorine weight ratio is at least 100.

10. The composition of matter according to claim 6 in which the residual moisture content is not more than about 5% by weight.

11. The composition of matter according to claim 6 in which the phosphorus to fluorine weight ratio is at least 100 and in which the residual moisture content is not more than 5% by weight.

12. The composition of matter according to claim 6 in which the phosphatic raw material is in the form of particles substantially all of which are less than about 10 mesh.

13. The composition of matter according to claim 6 in which substantially all of the phosphatic raw material is a thermally defluorinated phosphate product having a particle size of less than about 35 mesh (Tyler Standard).

References Cited by the Examiner

UNITED STATES PATENTS

| | | | |
|---|---|---|---|
| 2,893,834 | 7/1959 | Richardson | 71—41 |
| 2,914,380 | 11/1959 | Vickery | 23—109 |
| 2,995,436 | 8/1961 | Hollingsworth et al. | 71—44 |
| 2,995,437 | 8/1961 | Hollingsworth | 71—44 |
| 2,997,367 | 8/1961 | Williams | 71—44 |
| 3,099,530 | 7/1963 | Nickerson | 71—44 |
| 3,107,145 | 10/1963 | Hinkle et al. | 71—44 |

DONALL H. SYLVESTER, *Primary Examiner.*

ANTHONY SCIAMANNA, *Examiner.*